(12) United States Patent
Wolf

(10) Patent No.: US 8,026,845 B2
(45) Date of Patent: Sep. 27, 2011

(54) POSITIONING AND TRANSMITTING SYSTEM

(75) Inventor: Thomas G. Wolf, Mountain View, CA (US)

(73) Assignee: QUALCOMM Incorporated, San Diego, CA (US)

(*) Notice: Subject to any disclaimer, the term of this patent is extended or adjusted under 35 U.S.C. 154(b) by 169 days.

(21) Appl. No.: 12/103,512

(22) Filed: Apr. 15, 2008

(65) Prior Publication Data

US 2009/0033550 A1 Feb. 5, 2009

Related U.S. Application Data

(60) Provisional application No. 60/912,136, filed on Apr. 16, 2007.

(51) Int. Cl.
*G01S 19/21* (2010.01)
(52) U.S. Cl. .................................. 342/357.29
(58) Field of Classification Search ............ 342/357.02, 342/357.09, 357.1, 357.12, 357.15, 357.59; 344/78, 79, 218–224, 249.1, 250.1, 295, 344/296; 455/78, 79, 218–224, 249.1, 250.1, 455/295, 296
See application file for complete search history.

(56) References Cited

U.S. PATENT DOCUMENTS

| | | | |
|---|---|---|---|
| 4,216,432 A * | 8/1980 | Imazeki et al. | 455/79 |
| 5,945,944 A | 8/1999 | Krasner | |
| 6,150,980 A | 11/2000 | Krasner | |
| 6,433,734 B1 | 8/2002 | Krasner | |
| 6,442,375 B1 * | 8/2002 | Parmentier | 455/78 |
| 6,449,461 B1 * | 9/2002 | Otten | 455/63.1 |
| 6,791,491 B2 * | 9/2004 | Talvitie | 342/357.02 |
| 6,799,050 B1 | 9/2004 | Krasner | |
| 6,825,802 B2 * | 11/2004 | Warloe | 342/357.1 |
| 6,885,336 B2 * | 4/2005 | Forrester | 342/357.76 |
| 6,961,019 B1 * | 11/2005 | McConnell et al. | 342/357.1 |
| 7,020,487 B2 * | 3/2006 | Kimata | 455/556.1 |
| 7,117,008 B2 * | 10/2006 | Bajikar | 455/552.1 |
| 7,250,899 B2 * | 7/2007 | Smith et al. | 342/19 |
| 7,269,429 B2 * | 9/2007 | Galetti | 455/456.3 |
| 7,362,264 B2 * | 4/2008 | Landmark | 342/357.02 |
| 7,408,880 B2 * | 8/2008 | Xiao et al. | 370/235 |
| 7,453,396 B2 * | 11/2008 | Levin et al. | 342/357.1 |

(Continued)

FOREIGN PATENT DOCUMENTS

EP 1079533 2/2001

(Continued)

OTHER PUBLICATIONS

International Search Report and Written Opinion—PCT/US2008/060519, International Search Authority—European Patent Office—Feb. 10, 2009.

*Primary Examiner* — Thomas H Tarcza
*Assistant Examiner* — Cassi Galt
(74) *Attorney, Agent, or Firm* — Linda G. Gunderson

(57) ABSTRACT

A control module interconnecting a transmitter portion and a signal receiver portion of a mobile device is provided. The control module monitors the transmitter portion of the mobile device and, based on the monitored condition, alters the mobile device to inhibit the ability of a transmission signal from a transmitter to interfere with the signal receiver portion, i.e., intelligent blanking. In other words, the control module may disable or modify the signal receiver portion when power on the transmitter portion exceeds a predetermined power threshold level. Alternatively the control module may force the transmitter portion to transmit at a reduced power level.

29 Claims, 5 Drawing Sheets

U.S. PATENT DOCUMENTS

| | | | |
|---|---|---|---|
| 7,535,413 B2 * | 5/2009 | Leinonen et al. | 342/357.01 |
| 7,598,908 B2 * | 10/2009 | Chao et al. | 342/357.1 |
| 7,620,120 B2 * | 11/2009 | Auranen | 375/316 |
| 2002/0021244 A1 * | 2/2002 | Aizawa et al. | 342/357.12 |
| 2002/0107033 A1 * | 8/2002 | Kim | 455/456 |
| 2004/0242256 A1 | 12/2004 | Xiao et al. | |
| 2004/0247058 A1 | 12/2004 | Abraham | |
| 2005/0215204 A1 * | 9/2005 | Wallace et al. | 455/78 |

FOREIGN PATENT DOCUMENTS

| | | |
|---|---|---|
| WO | WO9936795 | 7/1999 |
| WO | WO0013034 | 3/2000 |
| WO | WO2004109940 | 12/2004 |
| WO | WO2006107381 | 10/2006 |

* cited by examiner

POSITIONING AND TRANSMITTING SYSTEM

CLAIM OF PRIORITY UNDER 35 U.S.C. §119

The present Application for Patent claims priority to Provisional Application No. 60/912,136 entitled "POSITIONING AND TRANSMITTING SYSTEM" filed Apr. 16, 2007, and assigned to the assignee hereof and hereby expressly incorporated by reference herein.

BACKGROUND

1. Field

The technology of the present application relates generally to wireless devices having both positioning and transmitting capabilities, and more specifically to reducing interference between a wireless device's transmitter associated with the transmitting capabilities and receiver associated with the positioning capabilities.

2. Background

Mobile devices, such as, for example, laptop computers, handheld computers, cellular telephones, pagers, personal digital assistants, and the like are becoming ubiquitous. Mobile devices typically include a relatively high power transmitter that is used periodically to transmit information over a wireless network.

The addition of navigation or position locating systems to mobile devices is increasing as the technology for such position locating systems is becoming more cost effective, power efficient, and generally widely available. Position locating systems may use terrestrial signals, satellite signals, or a combination thereof. Many position locating systems, however, use satellites to facilitate determining the position of the wireless device. Satellite positioning systems (or SPS) include systems, such as, for example, the Global Positioning System (GPS—Originally titled NAVSTAR GPS when developed by the military) the Global Navigation Satellite Systems (GNSS), the Galileo positioning system (Europe), the Glonass (Russian), the Compass/Beidou (Chinese), the QZSS (Japanese), and the like. The position locating systems may be used for many applications including, for example, personal security, vehicle and personnel tracking, inventory control, and emergency response to name but a few applications of position locating systems.

Mobile devices using SPS generally include a highly sensitive SPS receiver to acquire and track the generally weak SPS signal. The highly sensitive SPS signal receiver can be affected by the co-located high power transmitter used to periodically transmit information from the mobile device. In one aspect, the high power transmitter couples and interferes with the SPS receiver. The interference may decrease the performance of the SPS receiver.

Some current approaches to overcoming the interference between the high power transmitter and the highly sensitive SPS receiver include the use of complicated filters or high dynamic range circuits in the SPS receiver to limit the interference. These approaches, however, may require the use of complex additional circuitry that can increase the cost and power consumption of the combined unit. For example, one method includes using band pass filters in the radio frequency front end of the SPS transmitter to reduce and possibly eliminate the radio frequency interference from the high power transmitter. Using band pass filters is problematic at best because often several filters are required increasing the number of parts, volume, costs and the like to add the additional parts to the mobile device. Moreover, using filters tends to increase the noise figure of the SPS receiver, making it less sensitive, which decreases performance.

Another approach to overcoming the interference between the high power transmitter and the highly sensitive SPS receiver includes turning the SPS receiver off while the high power transmitter is powered. This technique is generally known as "blanking." While decreasing the complexity, size, and power drain of the aforementioned method, blanking also has drawbacks. One such drawback includes a decrease in the sensitivity of the SPS receiver due to the fact that it is turned off for a period of time. Turning off the SPS receiver hinders, for example, signal acquisition and tracking that may increase power consumption as the SPS receiver may take longer in its attempts to reacquire the signal.

Still another approach to overcoming the interference between the high power transmitter and the highly sensitive SPS receiver includes increasing the linearity of the SPS receiver, allowing it to function in the presence of the interfering signal. However, receivers that maintain linearity in the presence of strong signals, require more power to function. Increasing the power to the SPS receiver has drawbacks as well. Among other things, increasing the power needed by the SPS receiver consumes additional power reducing the available time of use from the battery.

Thus, improved apparatuses, methods, computer program products, and the like are needed to improve the operation of position locating systems in the presence of relatively high power transmitters.

SUMMARY

Embodiments disclosed herein address the above stated needs by providing a mobile device. The mobile device includes a transmitter portion and a signal receiver portion. The transmitter portion and the signal receiver portion are interconnected by a control module. The control module monitors a transmission power of the transmitter portion and disables or modifies the signal receiver portion when the monitored power exceeds a predetermined first threshold power level.

Embodiments disclosed herein also address the above stated needs by providing a method of operating the mobile device. The method of operating the mobile device includes monitoring a transmission power of a transmitter portion of a mobile device. Using the monitored transmission power, the method further includes determining whether the transmitting power exceeds a predetermined first power level threshold. If the determination is that the power exceeds the first power threshold level, the method further includes disabling or modifying a signal receiver portion of the mobile device when it is determined that the transmitting power exceeds the predetermined first power level threshold.

Embodiments disclosed herein further address the above stated needs by reducing the power of the transmitter portion to reduce the interference between the transmitter portion and the signal receiver portion. The mobile device includes a transmitter portion and a signal receiver portion. The mobile device further includes a means for determining a power level of the transmitter portion and a means for determining whether the transmitter portion is transmitting voice information or data information. If it is determined the transmitter portion is transmitting data information, the mobile device further includes a means for reducing the power level of the transmitter portion to below a predetermined first power threshold level such that the interference to the signal receiver portion based on the transmitter portion is reduced.

Embodiments disclosed herein further address the above stated needs by providing methods to inhibit a transmitter portion from interfering with a signal receiver portion. The methods include identifying an initial operating mode of the mobile device and selecting one or more interference thresholds corresponding to one or more interfering activities that is based on the initial operating mode of the mobile device. A control module monitors the one or more activities of the mobile device to determine whether the one or more activities exceed the one or more interference thresholds. If it is determined the one or more activities exceed an interfering threshold, the control module operates the mobile device in a manner to reduce interference between the transmitter portion and the signal receiver portion until the one or more interfering activity is reduced below the one or more interference threshold.

Embodiments disclosed herein further address the above stated needs by providing a device. The device comprises a transmitter portion capable of transmitting a relatively high power signal and a receiver portion having a relatively sensitive receiver. A control processor interconnects the transmitter portion and the signal receiver portion. The control processor operates to identify an operating mode of the device and to select one or more interference thresholds based on the identified operating mode. The control processor monitors the device to determine if one or more activities corresponding to the interference thresholds exceeds the one or more interference thresholds and to cause the device to operate in a manner to reduce the interference between the transmitter portion and the receiver portion

DETAILED DESCRIPTION

Figure 1:
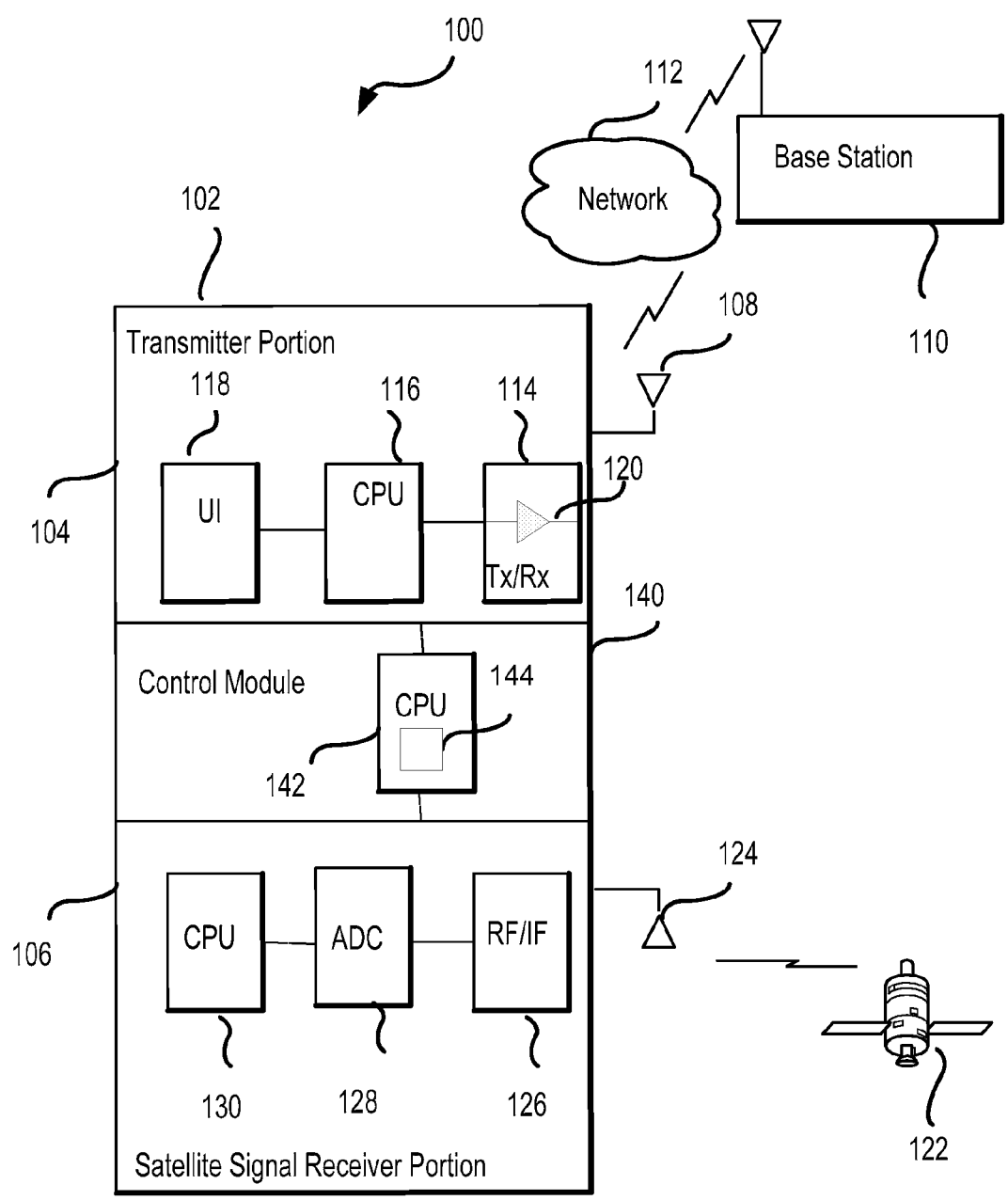
FIG. 1 is a functional block diagram of an embodiment using the technology of the present application.

The technology of the present application will now be explained with reference to the figures. Moreover the technology of the present application will be described with particular regard to a mobile device providing both a transmitter to communicate voice or data information between the mobile device and a wireless network and a position location receiver to receiver satellite signals in order to provide position location information, which may be processed locally at the mobile device or remotely using a position determination entity (PDE). One of ordinary skill in the art will now recognize on reading the disclosure that the technology of the present invention would be useful in situations where a device has, in reasonably close proximity a transmitter that produces a radio frequency energy signal and a receiver that receives a radio frequency energy signal wherein the transmitter may interfere with the receiver. The technology of the present application is thus useful in devices such as cellular telephones having satellite positioning systems (SPS) where voice data is transmitted using a relatively high power transmitter and the SPS receiver includes a highly sensitive receiver to receive the relatively weak satellite signals. In that regard, the technology of the present application is described with reference to particular exemplary embodiments of the technology. The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless identified to the contrary.

The technology of the present application will generally be described with particular reference to a mobile device transmitting voice communication over a wireless communicating network, such as, for example, a wireless wide area network (WWAN), a wireless local area network (WLAN), a wireless personal area network (WPAN), and so on. The term "network" and "system" are often used interchangeably herein. Also, while the technology of the present application is generally described in relation to using either a Global System for Mobile Communications (GSM) protocol or a Code Division Multiple Access (CDMA) protocol on the wireless communicating network, other transmission protocols are possible. Such other transmission protocols include, but are not limited to, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on.

The technology of the present application also will be generally described with particular reference to the mobile device receiving positioning signals from a positioning system using a satellite transmitter. The satellite positioning system may include, for example, the Global Positioning System (GPS—Originally titled NAVSTAR GPS when developed by the military) the Global Navigation Satellite Systems (GNSS), the Galileo positioning system (Europe), the Glonass (Russian), the Compass/Beidou (Chinese), the QZSS (Japanese), and the like. The position locating systems may be used for many applications including, for example, personal security, vehicle and personnel tracking, inventory control, and emergency response to name but a few applications of position locating systems.

Referring now to FIG. 1, a positioning and communicating system 100 is shown. The positioning and communication system 100 includes a mobile device 102 having a transmitter portion 104, a satellite signal receiver portion 106, and a control module 140 coupling the transmitter portion 104 and the satellite signal receiver portion 106. While described as satellite signal receiver portion 106 as an exemplary illustration of a signal receiver that requires a highly sensitive receiver, one of ordinary skill in the art will now recognize on reading the disclosure that any device having a transmitter portion and a receiver portion in close proximity such that the transmitter portion may interfere with the receiver portion would benefit from the teachings of the present application. Thus, satellite signal receiver portion 106, which describes the specific exemplary embodiment, should be construed generically as a signal receiver portion.

Transmitter portion 104 may be integrated in a transceiver and be configured to transmit and receive voice and/or data information using antenna 108 in communication with one or more base stations 110 over a wireless communicating network 112. In the illustrated embodiment, transmitter portion 104 includes at least transmit/receive circuitry 114 connected to antenna 108, a control processor 116 connected to transmit/receive circuitry 114, and an interface 118 connected to control processor 116. The interface 118 typically comprises a keyboard, a speaker and microphone, as is conventional with most cellular telephones, but could comprise additional or different interfaces, such as, for example, a graphical user interface, a digital pen, or the like. Control processor 116 controls the major functions of the transmitter portion 104 including providing computing functionality to process the inputs and/or data required for operation of the transmitter portion 104. The transmit/receive circuitry 114 may be one or more actual circuits and may work over various wavelengths and protocols as identified above. Transmit/receive circuitry 114 may perform functions that are typical of such components as used in wireless communication systems, such as modulating signals received from the control processor 116 that are to be transmitted from antenna 108, and demodulating signals received at antenna 108. The demodulated signal is provided to control processor 116 for processing. Transmit/receive circuitry 114 may include a power amplifier 120 to amplify signals to be transmitted via antenna 108.

Satellite signal receiver portion 106 receives satellite signals from a satellite 122 at a satellite antenna 124. Satellite signal receiver portion 106 includes at least a downconverter 126 coupled to satellite antenna 124, satellite signal processing circuitry 128 coupled to downconverter 126, and a control processor 130. Control processor 130 controls the major functions of the satellite signal receiver portion 106 including satellite signal acquisition, tracking, and processing. Downconverter 126 downconverts the high frequency modulated satellite signal into a lower intermediate frequency. Satellite signal processing circuitry 128 digitizes the analog signal into a digital format usable by control processor 130.

While shown as separate components, many of the components and features of mobile device can be integrated into one or more integrated units. Similarly, functional components shown as a single functional block may be separated into multiple devices. For example, antenna 108 and satellite antenna 124 are shown as separate antennae in FIG. 1. However, it is possible that antenna 108 and satellite antenna 124 may be integrated into a single antenna having multiple operating frequencies. In another example, antenna 108 and/or antenna 124 may comprise more than one antenna units; e.g., for signal diversity. Moreover, control processor 116 and control processor 130 may be a single control processor or multiple processors as a matter of design choice. Transmitter portion 104 and satellite signal receiver portion 106 are generally shown and described using separate components for convenience. Similarly, control processor 116 may be several processors.

As mentioned above, mobile station 102 also comprises the control module 140. Control module 140 is shown interconnecting transmitter portion 104 and satellite signal receiver portion 106. Control module 140 comprises at least a control processor 142 to control the major functions of the control module 140, which will be explained herein below. Control processor 142 may be integrated, separate from, or a combination thereof with control processors 116 and 130. Control module 140 operates to detect activity or configurations of mobile station 102 and enable or disable satellite signal receiver portion 106. Disabling or blanking satellite signal receiver portion 106 can be based on, for example, a transmission power level associated with power amplifier 120, an antenna configuration of satellite antenna 124, for example, if antenna 124 is placed sufficiently distant from antenna 108, priority of transmitting needs (in other words, is the voice communication a higher priority than the position location determination, which will be explained further below), or the like.

Control module 140 and control processor 142 may be implemented in hardware, software, firmware, or a combination thereof. For hardware implementations, processing units may be integrated into one or more application specific integrated circuits, such as, for example, ASICs, digital signal processors (DSPs), digital signal processing devices (DSPDs), programmable logic devices (PDLs), field programmable gate arrays (FPGAs), processors, controllers, micro-controllers, microprocessors, electronic devices, microchips, or other devices designed to perform the functions described. These devices may generically be referred to as controllers, control processors, central processing units, computer signal processors, CPU, or the like.

Figure 2:
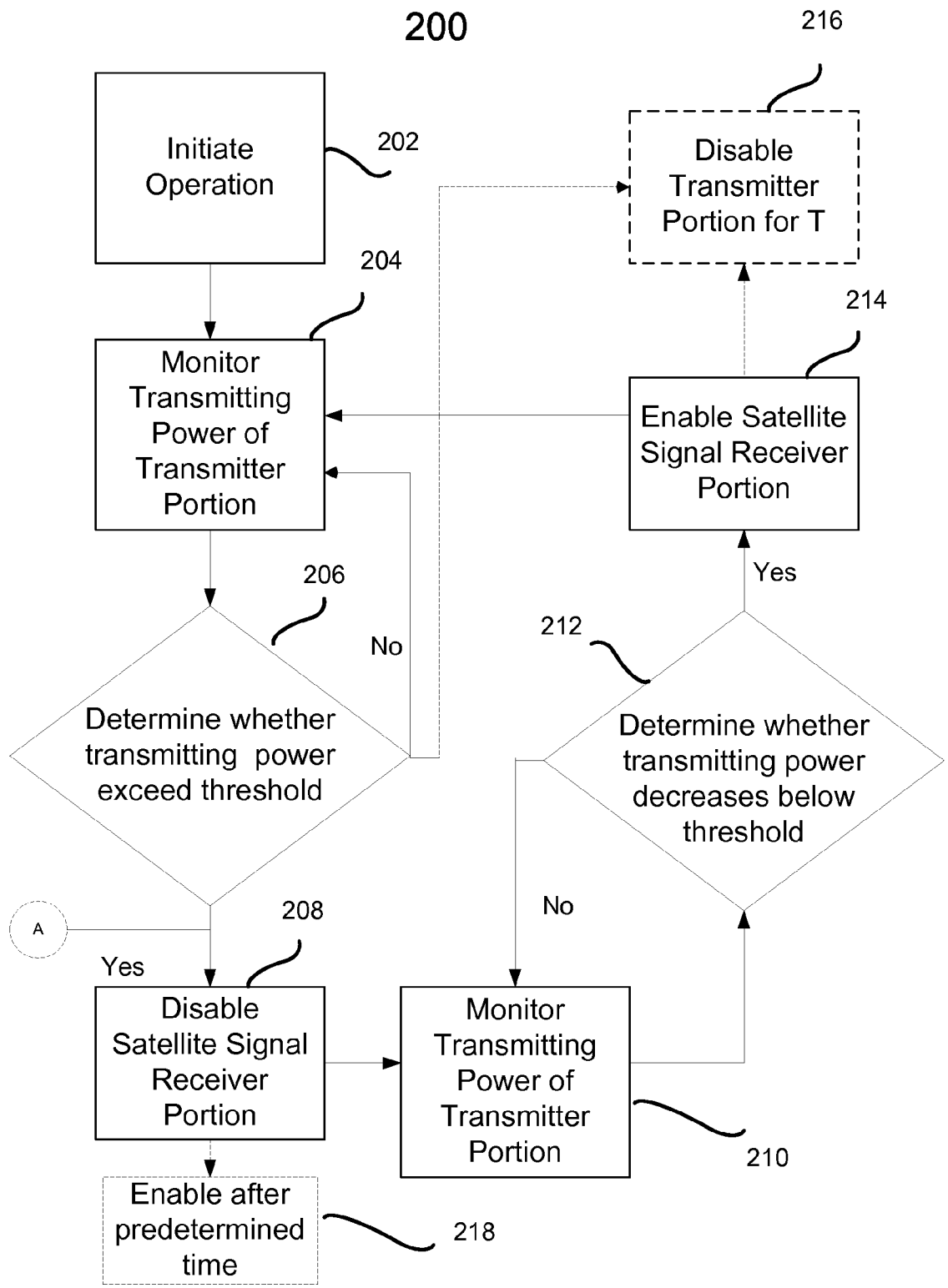
FIG. 2 is an illustrative operational flowchart showing operational steps associated with the technology of the present application.

Referring now to FIGS. 1 and 2, operational steps for using the control module 140 to enable and disable the satellite signal receiver portion 106 are now described for an exemplary embodiment illustrated in flowchart 200. It is noted, at the outset, that the operational steps described in this and any of the exemplary embodiments herein are described to provide examples and illustrations. The operations described may be performed in numerous different sequences other than the illustrated sequences. Additionally, one or more operational steps described in the following exemplary embodiments may be combined with one or more other operational steps or one or more operational steps described may be broken up into multiple operational steps. Moreover, more, less, and other operational steps may be included without departing from the spirit and scope of the technology as claimed herein.

In the exemplary embodiment of FIG. 2, an operation initiates at block or step 202. The control module 140 monitors operating power of transmitter portion 104, step 204. While monitoring the transmitting power, typically based on power amplifier 120, control processor 142 of control module 140 would determine whether transmitting power exceeds a predetermined threshold, step 206. If it is determined transmitting power does not exceed the predetermined threshold, control returns to step 204. If it is determined transmitting power exceeds the predetermined threshold, control module 140 disables satellite signal receiver portion 106, step 208. Once disabled, the control module 140 continues monitoring transmitting power of the transmitter portion 104, step 210. While continuing to monitor the transmitting power, it is determined whether transmitting power decreases below the threshold (or a second threshold as a matter of design choice), step 212. If it is determined that power does not decrease below the threshold, control returns to step 210. If it is determined that power does decrease below the threshold, satellite signal receiver portion is enabled, step 214, and control is returned to step 204 to monitor for the next transmission. As can be appreciated, determining whether transmitting power decreases below a threshold can be combined with a time element to avoid needlessly cycling the satellite signal receiver portion between enabled and disabled for periods where the power decreases below the threshold for a short period of time. The above process may be performed any of continuously, semi continuously, or iteratively. In certain aspects of the technology of the present application, transmitter portion 104 may be in either an idle or active (in-call) state, such as, for example, for CDMA protocol based cellular telephones. For this configuration, satellite signal receiver portion 106 may not be blanked while in the active state due to the constant transmission. Instead, reduced receiver performance, or operating the receiver in a high power, high linearity mode may be implemented. However, under the CDMA protocols, when in the idle state, transmitter portion 104 typically operates at a low duty cycle, transmitting small bursts of information periodically. In the idle state, therefore, control module 140 may operate to inhibit interference during those short high power information bursts.

Optionally, when the satellite signal receiver portion is enabled (e.g., during a time when the transmission power is below the threshold as determined at 206 or after the transmitting power decreases below the threshold after having exceeded the threshold at 212), the control module 140 may disable the transmitter portion 104 for a time T to allow the satellite signal receiver portion a sufficient amount of time to acquire and process satellite information, step 216. The disabling of transmitter portion 104 may be shorter or longer as a matter of design choice and the reasons for disabling the transmitter portion 104. Additionally, the time T need not be contiguous; for example, transmitter portion 104 may be disabled for a plurality of shorter time periods that are separated by at least one period during which transmitter portion 104 is enabled.

The disabling of the transmitter portion 104 may result in a portion of the voice transmission being lost or delayed. Thus, control module 140 may be provided with an override 144 to enable transmitter portion 104 as necessary. As can be appreciated, override 144 also may disable transmitter portion 104 to allow satellite signal receiver portion to operate in cases where location is a higher priority than voice communication, such as location for emergency services or the like. In FIG. 1, override 144 is illustrated as instructions stored in a memory integral to processor 142 to be executed by processor 142. However, override 144 may be implemented at least partially in hardware and may include at least a portion that is separate from processor 142.

The threshold may be manually set based on configuration information regarding mobile device. The power threshold to disable the satellite signal receiver portion may be set higher than an idle power transmission level for a CDMA based cellular telephone, but lower than the transmit power level. Such a configuration enables intelligent blanking to be used for CDMA based cellular telephones. In some cases, the above functionality of control module 140 may be referred to as intelligent blanking or the control module itself may be referred to as an intelligent blanking module, or the like. Conventionally, CDMA based cellular telephones do not use blanking techniques as conventional blanking is based solely on whether the transmitter portion power amplifier is powered. By providing one or more power thresholds, CDMA based cellular devices may take advantage of blanking. The threshold may be set between the idle and maximum transmit power levels. The actual threshold may be affected by, for example, shielding between the transmitter and the satellite antenna, distance between the transmitter and the satellite antenna, power supplied to the satellite signal receiver (which allows for operation in the presence of higher transmit power levels), and the like or a combination of factors.

The threshold also may be adjustable. Control module 140 may provide a range of possible thresholds at which satellite signal receiver portion 106 is disabled depending on the accuracy of currently available location information. For example, if no location information is currently available, control module 140 may set a high threshold to allow satellite signal receiver portion to obtain the satellite signal and provide navigation or location information—potentially tolerating some error due to interference to obtain at least some location information. At the other extreme, if the exact location of the mobile device is currently known or knowable, control module 140 may set a low threshold to disable the satellite signal receiver portion to inhibit interference from introducing error into the location information. Of course, if some location information is available, it is possible the threshold would be set high as the location system could tolerate more errors based on the known information. And if no location information is currently available, control module 140 may establish a low threshold to reduce any errors introduced via interference for the initial location determination.

With further reference to FIG. 2, optionally, instead of monitoring transmitting power of transmitter portion after the control module disables satellite signal receiver portion, control module 140 may enable the satellite signal receiver portion after a predetermined time, step 218.

Figure 3:
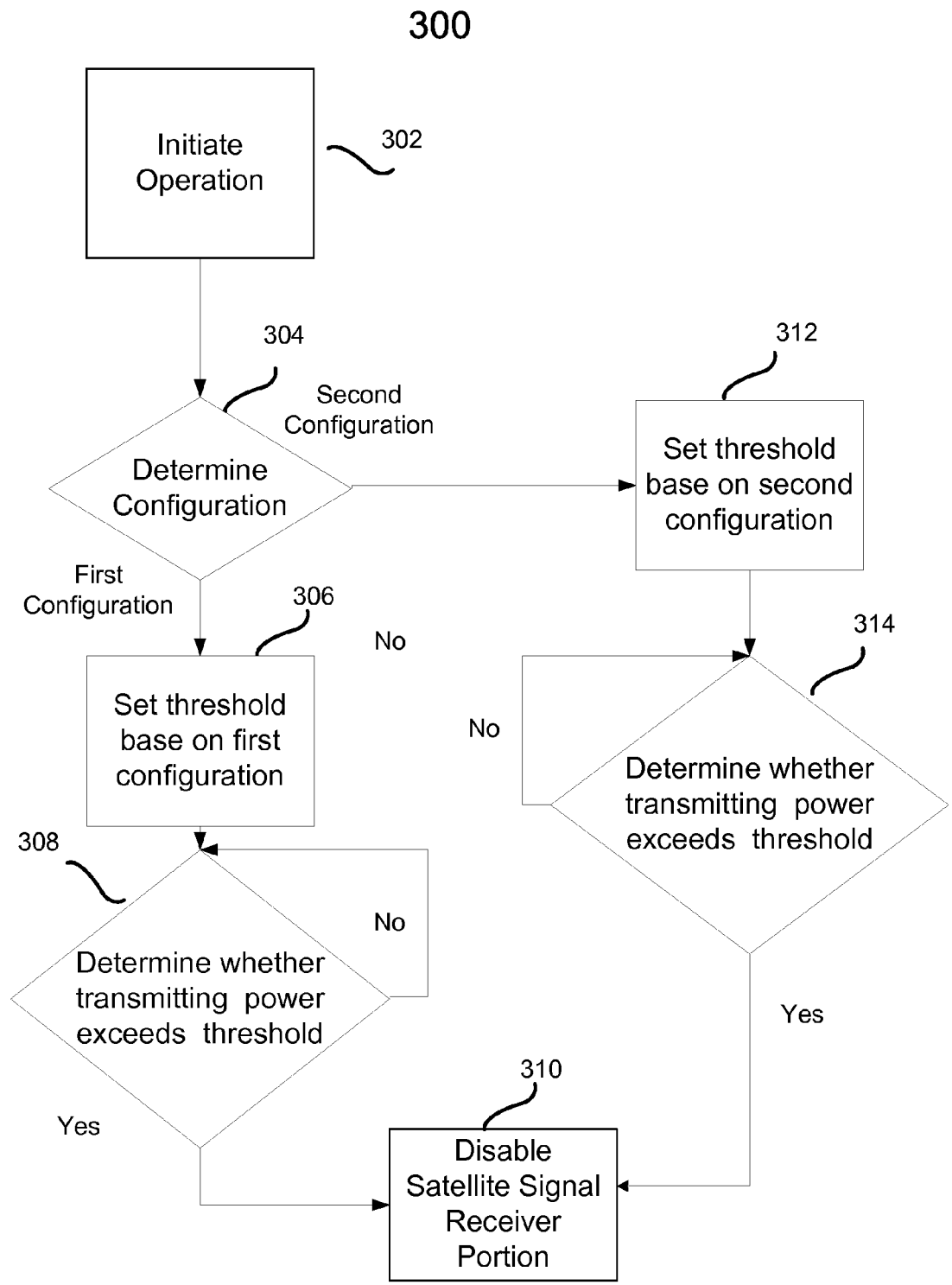
FIG. 3 is an illustrative operational flowchart showing operation steps associated with the technology of the present application.

Referring now to FIGS. 1 and 3, an operational embodiment associated with the determining whether a threshold is exceeded is explained in more detail in connection with an illustrative flowchart 300. An operation starts at block or step 302. The control module 140 determines a configuration of mobile device 102, step 304. For example, mobile device may have a first configuration where the satellite antenna 124 is in close proximity to transmitter portion 104. In a second configuration, for example, satellite mobile device 102 may be mounted, for example, in a car, such that the satellite antenna 124 is actually mounted external to the car. More and other configurations are of course possible. For example, a first configuration may be when mobile device 102 does not have a known location and second configuration may be when mobile device 102 does have a known location. Still another example includes a first configuration that may involve internal antennas, a second configuration that may involve an external antenna, and a third configuration that may involve a combination of internal and external antennas. Alternatively, a first and second configuration may be with an antenna retracted or extended. Still other configurations include whether application data or voice data is being transmitted (which will be explained further below). If it is determined the mobile device 102 is in a first configuration, control module sets the threshold based on the first configuration, step 306. Control module 140 would monitor operating power of transmitter portion 104 similar to step 204 of FIG. 2 (not specifically shown in FIG. 3 for convenience). Continuously, semi continuously, and/or iteratively, control module 140 would determine whether power exceeds the first configuration threshold, step 308. If power does not exceed the first configuration threshold, operation 300 continues to monitor and determine based on its monitoring and determining protocol. If it is determined the first configuration threshold is exceed, control module 140 disables the satellite signal receiver portion 106, step 310. The satellite signal receiver portion 106 would be enabled following any of the illustrative examples associated with FIG. 2.

If at step 304 it is determined the mobile device 102 is in a second configuration, control module 140 sets the threshold base on the second configuration, step 312. Control module 140 would monitor monitors operating power of transmitter portion 104 similar to step 204 of FIG. 2 (not specifically shown in FIG. 3 for convenience). Continuously, semi continuously, and/or iteratively, control module 140 would determine whether power exceeds the second configuration threshold, step 314. If power does not exceed the first configuration threshold, operation 300 continues to monitor and determine based on its monitoring and determining protocol. If it is determined the second configuration threshold is exceed, control module 140 disables the satellite signal receiver portion 106, step 310. The satellite signal receiver portion 106 would be enabled following any of the illustrative examples associated with FIG. 2.

Figure 4:
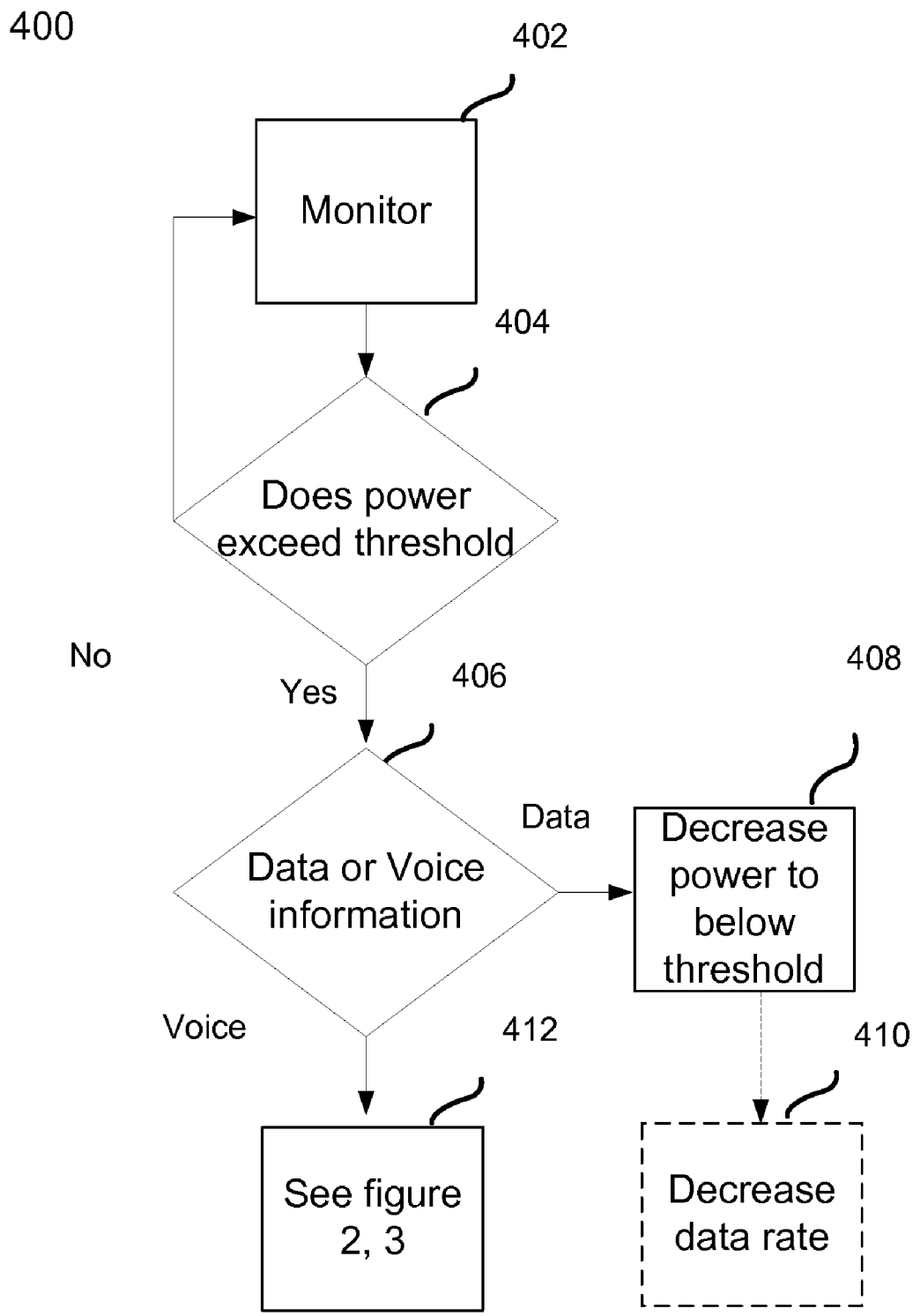
FIG. 4 is an illustrative operational flowchart showing operation steps associated with the technology of the present application.

As mentioned above, in some instances, mobile device 102 may transmit data information instead of voice information. Unlike voice information where lower throughput may disrupt voice communication, data information frequently may be delivered at lower power, when using a lower throughput value or a higher acceptable error rate. Thus, referring now to FIGS. 1 and 4, an exemplary embodiment of the operation of the control module 140 is illustrated in flowchart 400. First, control module 140 would monitor transmitter portion 104 to determine a power of transmitter portion 104, step 402. Next, control module would determine whether power exceeds a threshold (which may be set as shown in FIG. 3), step 404. If power does not exceed a threshold, control is returned to step 402. If power does exceed the threshold, control module 140 would next determine whether transmitter portion 104 is transmitting voice or data information, step 406. If it is determined that transmitter portion 104 is transmitting data information, control module 140 would decrease power to power transmitter 120 to a level below the set threshold, step 408. Optionally, control module 140 may decrease the throughput or data rate, step 410. If higher error rates in the transmission can be tolerated, the data rate may not be lowered. If it is determined that the transmission is voice information, the satellite signal receiver portion 106 may be disabled/enabled as described in, for example, FIGS. 2 and/or 3, step 412.

Figure 5:
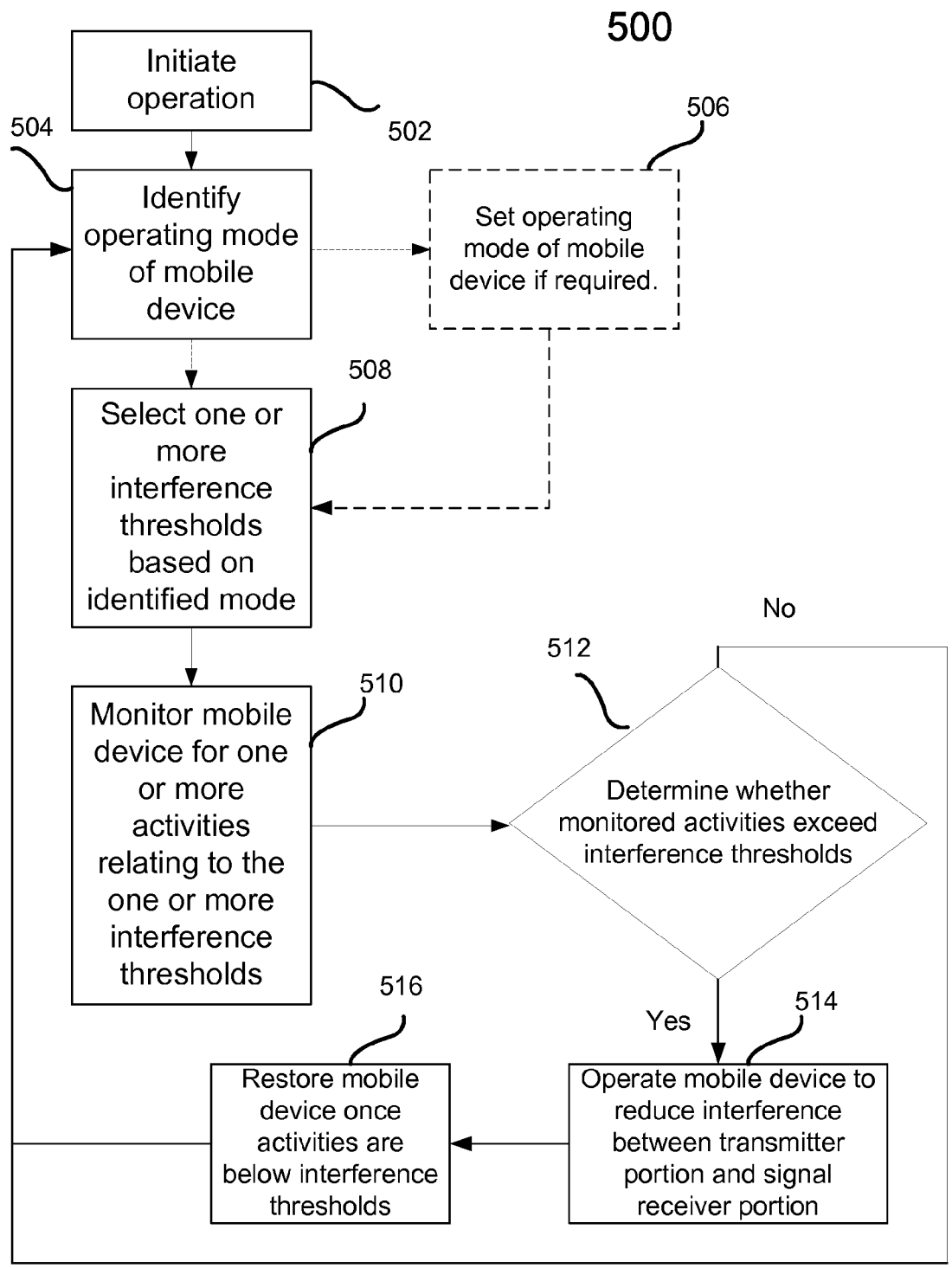
FIG. 5 is an illustrative operational flow chart showing operation steps associated with the technology of the present application.

While described above as disabling satellite signal receiver portion 106 or decreasing power to transmitter portion 104, control module 140 allows for an intelligent control of interference between the transmitter portion 104 and receiver portion 106. Referring now to FIGS. 1 and 5, another operational embodiment associated with the technology of the present application is provided. An operation is initiated at step 502. Optionally, the control module 140 identifies an operating mode of the mobile device, step 504. The operating mode of the mobile device may include mobile device configuration information, such as relative proximity of antennas, battery power, priority of various applications, such as, for example, when transmission of voice information during a 911 call would take priority over other applications, type of information being transmitted, such as data or voice information, or the like. If a priority operating mode is necessary, the control module 140 sets the operating mode of mobile device to allow the priority application, step 506. Setting the mobile device 102 operating mode to allow the priority application may, for example, allow other operations, but accept a level of interference between the transmitter portion 104 and the satellite signal receiver portion 106. Alternatively, the non-priority applications may be disabled or controlled to activity levels below predetermined interference thresholds. Next, control module 140 would select one or more predetermined interference thresholds based on the identified operating mode of the mobile device 102, step 508. For example, control module 140 may select a threshold based on operating power of the transmitter portion 106, control module 140 may select a threshold based on the type of information being transmitted, control module 140 may select a threshold based on operating the satellite signal receiver portion 106 in a high linearity mode, control module 140 may select a threshold based on priority of various mobile device 102 operations, or the like. Control module 140 next would monitor one or more activities associated with the one or more interference thresholds of the mobile device 102, step 510. Control processor 142 of control module 140 while monitoring the power would determine whether the one or more monitored activities exceed the one or more predetermined interference thresholds, step 512. If it is determined transmitting power does not exceed the predetermined threshold, control returns to step 504. If it is determined that the one or more monitored activities exceeded one or more interference threshold, control module 140 operates the mobile device 102 to reduce interference between the transmitter portion 104 and the satellite signal receiver portion 106, step 514. Control module 140 may select one of a plurality of predetermine interference reducing operating modes to reduce the interference. For example, one interference reducing operating mode may include operating the satellite signal receiver portion 106 in a high linearity mode if battery power is sufficient. Another interference reducing operating mode may be to decrease transmitter power of transmitter portion 104. Another interference reducing operating mode may be disabling the satellite signal receiver portion 106. Still another interference reducing operating mode may be to disable the transmitter portion 104. Other operating modes are, of course possible. Once the one or more activities are below the respective one or more interference thresholds, control module 140 restores the mobile device 102, step 504, and control returns to step 504.

Herein, enabling and disabling receivers may be accomplished in a number of ways. Referring again to FIG. 1 (illustrating the example where the sensitive receiver is a satellite receiver), satellite signal receiver portion 106 may be disabled by disconnecting the connection from antenna 124 and switching the receiver input to ground (zero signal). Thus, the receiver is still active, but gets no signal. In another embodiment, the signal path may be switched through the receiver to a forced zero at several intermediate stages to ensure that nowhere in the receiver can a distorted signal be picked up and propagated. Places that may get switched to zero can include the receiver input, intermediate amplifier inputs in the receiver, the input to the Analog to Digital Converter (ADC) 128 which comes from the analog portion of the receiver, the digital stream out of the ADC 128 where it goes into the digital signal processing portion 130 of the receiver, and/or other appropriate switching. Conceptually, an objective is to prevent the strong transmit signal from getting through the receiver where it can cause distortion of the desired signal (analysis has shown that no signal for brief periods of time is better than a distorted signal). This could be done several ways, which include disconnecting the antenna input and/or other intermediate points, turning off (removing power from) some or all of the receiver, and switching the receiver to a reduced gain state, so that the interfering signal does not cause undue distortion (this variant would not fully disable the receiver, but would limit its performance to a level where the interference is tolerable; herein we refer to limiting the performance as partially disabling the receiver).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. For example, functions of processor 116, processor 142, and/or processor 130 may be performed using a CPU or any other type of process structure, such as a DSP, ASIC, etc. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile device comprising:
   a transmitter portion;
   a signal receiver portion comprising a position location receiver; and
   a control module to:
   monitor transmission power of the transmitter portion;
   in response to a determination that the monitored power exceeds a first threshold power level, determine whether the transmitter portion is transmitting voice information or data information and whether the signal receiving portion has a higher priority than the transmitter portion, wherein the first threshold is based, at least in part, on available location information associated with the position location receiver;
   in response to a determination that the signal receiving portion has a higher priority than the transmitter portion, initiate an override to disable the transmitter portion;
   otherwise in the absence of the override:
   in response to a determination that the transmitter portion is transmitting voice information, at least partially disable the signal receiver portion; and
   in response to a determination that the transmitter portion is transmitting data information, decrease at least one of: the transmission power of the transmitter portion; and/or, a data rate of the transmitter portion.

2. The mobile device of claim 1, wherein the signal receiver portion comprises a satellite signal receiver.

3. The mobile device of claim 2, the control module to further fully enable the satellite signal receiver portion within a predetermined time after the satellite signal receiver portion is fully or partially disabled.

4. The mobile device of claim 1, the control module to further fully enable the signal receiver portion in response to a determination that the monitored power subsequently decreases below a second threshold power level.

5. The mobile device of claim 4, wherein the first, threshold power level and the second threshold power level are the same.

6. The mobile device of claim 4, wherein the first threshold power level and the second threshold power level are different.

7. The mobile device of claim. 1, wherein the first power threshold, is selected from a plurality of power thresholds associated with a plurality of physical antenna and/or mobile device location configurations.

8. A method comprising:
   monitoring a transmission power off transmitter portion of a mobile device;
   in response to a determination that the transmitting power exceeds a first power level threshold, determining whether the transmitter portion is transmitting voice information or data information and whether a signal receiving portion of the mobile device has a higher priority than the transmitter portion, wherein the signal receiving portion comprises a position location receiver and the first threshold is based, at least in part, on available location information associated with the position location receiver;
   in response to a determination that the signal receiving portion has a higher priority than the transmitter portion, initiating an override to disable the transmitter portion;
   otherwise in the absence of the override:
   in response to a determination that the transmitter portion is transmitting voice information, at least partially disabling a signal receiver portion of the mobile device; and
   in response to a determination that the transmitter portion is transmitting data information, decreasing at least one of: the transmission power of the transmitter portion; and/or, a data rate of the transmitter portion.

9. The method of claim 8, wherein the signal receiver portion comprises a satellite signal receiver.

10. The method of claim 8, further comprising:
    fully enabling the signal receiver portion in response to a determination that the transmitting power subsequently decreases below a second power level threshold.

11. The method of claim 9, further comprising:
fully enabling the satellite signal receiver portion at a predetermined time after the satellite signal receiver portion is fully or partially disabled.

12. The method of claim 8, further comprising:
setting the first power threshold level based, at least in part, on a physical antenna and/or mobile device location configuration.

13. An article comprising:
a computer readable storage media having stored therein instructions implementable by a processor in a mobile device to:
monitor a transmission power of a transmitter portion of the mobile device;
determine whether the monitored power level exceeds a first power threshold level;
in response to a determination that the monitored power exceeds the first threshold power level, determine whether the transmitter portion is transmitting voice information or data information and whether the signal receiving portion has a higher priority than the transmitter portion, wherein the signal receiving portion comprises a position location receiver and the first threshold is based, at least in part, on available location information associated with the position location receiver;
in response to a determination that the signal receiving portion has a higher priority than the transmitter portion, initiate an override to disable the transmitter portion;
otherwise in the absence of the override:
in response to a determination that the transmitter portion,is transmitting voice information, at least partially disable a signal receiver portion of a mobile device; and
in response to a determination that the transmitter portion is transmitt data information, decrease at least one of the transmission power of the transmitter portion; and/or, a data rate of the transmitter portion.

14. The article of claim 13, wherein the signal receiver portion comprises satellite signal receiver.

15. The article of claim 14, the instructions implementable by the processor further to fully enable the satellite signal receiver portion after a predetermined time after the satellite signal receiver portion is fully or partially disabled.

16. The article of claim 14, the instructions implementable by the processor further to fully enable the satellite signal receiver portion in response to a determination that the monitored transmission power subsequently decreases below at least one of the first power threshold level and/or a second power threshold level, wherein the second power threshold level is different from the first power threshold level.

17. The article of claim 13, the instructions implementable by the processor further to determine a physical antenna and/or mobile device location configuration and to set the first power threshold level to based, at least in part, on the determined configuration.

18. An apparatus comprising:
means for transmitting a signal;
means for receiving a satellite signal;
means for generating location information based, at least in part, on a received satellite signal;
means for determining a transmission power of the transmitted signal;
means for determining whether the transmitted signal comprises voice information or data information, in response to a determination that the transmission power of the transmitted signal exceeds a threshold power level, wherein the threshold power level is based, at least in part, on available location information;
means for determining whether the means for receiving has a higher priority than the means for transmitting, in response to a determination that the transmission power of the transmitted signal exceeds the threshold power level;
means for initiating an override to disable the means for transmitting, in response to a determination that the means for receiving has the higher priority than the means for transmitting;
means for at least partially disabling the means for receiving the satellite signal, in the absence of the override and in response to a determination that the transmitted signal comprises voice information; and
means for decreasing, in the absence of the override and in response to a determination that the transmitted signal comprises voice information, at least one of: the transmission power of the transmitted signal; and/or, a data rate of the transmitted signal.

19. The method of claim 8, wherein partially disabling the signal receiver portion of the mobile device comprises operating the signal receiver portion of the mobile device in a high linearity mode.

20. The method of claim 19, further comprising:
operating the signal receiver portion of the mobile device in the high linearity mode if a battery power is determined sufficient otherwise fully disabling the signal receiver portion.

21. The method Of claim 12, further comprising:
identifying the physical antenna configuration based, at least in part, on a proximity of a signal receiver portion antenna to a transmitter portion antenna.

22. The method of claim 12, further comprising:
identifying the physical antenna configuration based, at least in part, on whether a signal receiver portion antennais retracted.

23. The mobile device of claim 1, wherein the mobile device comprises at least one of: a laptop computer, a handheld computer, a smart phone, a portable digital assistant, a MP-3 player, and/or a cellular telephone.

24. The mobile device of claim 1, the mobile device further to operate with at least one of a Global System for Mobile Communications (GSM) protocol or a Code Division Multiple Access (CDMA) protocol.

25. The apparatus of claim 18, further comprising:
means for initiating a restoration of an initial operating mode.

26. The mobile device of claim 1, wherein the first threshold power level is based, at least in part, on at least one of:
an accuracy of the available location information;
a presence or absence of the available location information; or
an error tolerance-associated with the available location information.

27. The method of claim 8, wherein the first threshold is based, at least in part, on at least one of:
an accuracy of the available location information;
a presence or absence of the available location information; or
an error tolerance associated with the available location information.

28. The article of claim 13, Wherein the first threshold is based, at least in part, on at least one of:
    an accuracy of the available location information;
    a presence or absence of the available location information; or
    an error tolerance associated with the available location information.

29. The apparatus of claim 18, wherein the threshold power level is based, at least in part, on at least one of:
    an accuracy of the available location information;
    a presence or absence of the available location information; or an error tolerance associated with the available location information.

* * * * *